(12) United States Patent
Nourdine

(10) Patent No.: US 10,234,259 B2
(45) Date of Patent: Mar. 19, 2019

(54) DEVICE FOR MEASURING THE GEOMETRY OF A WHEEL AXLE OF A MOTOR VEHICLE

(71) Applicant: AuE Kassel GmbH, Kassel (DE)

(72) Inventor: Ahmed Nourdine, Kassel (DE)

(*) Notice: Subject to any disclaimer, the term of this patent is extended or adjusted under 35 U.S.C. 154(b) by 74 days.

(21) Appl. No.: 15/242,098

(22) Filed: Aug. 19, 2016

(65) Prior Publication Data

US 2017/0089687 A1    Mar. 30, 2017

(30) Foreign Application Priority Data

Aug. 21, 2015   (DE) .................... 10 2015 010 803

(51) Int. Cl.
| | | |
|---|---|---|
| G01B 5/25 | (2006.01) | |
| B60B 27/00 | (2006.01) | |
| B60B 35/00 | (2006.01) | |
| B62D 65/00 | (2006.01) | |
| G01B 5/255 | (2006.01) | |

(52) U.S. Cl.
CPC .............. *G01B 5/255* (2013.01); *B60B 27/00* (2013.01); *G01B 5/25* (2013.01); *B60B 35/00* (2013.01); *B62D 65/005* (2013.01)

(58) Field of Classification Search
CPC ......... G01B 5/255; G01B 5/25; B62D 65/005
USPC ........ 33/203.18, 203.19, 203.2, 203.21, 517, 33/203.12, 337; 29/252, 273; 73/118.1, 73/115.07, 146
See application file for complete search history.

(56) References Cited

U.S. PATENT DOCUMENTS

| | | | | |
|---|---|---|---|---|
| 1,804,490 | A * | 5/1931 | Bagge .................... | G01B 5/255 116/31 |
| 2,608,000 | A * | 8/1952 | Castiglia ................ | G01B 5/255 33/337 |
| 3,330,044 | A | 7/1967 | MacMillian | |
| 3,445,936 | A * | 5/1969 | Wilkerson ........... | G01B 11/275 33/203.18 |
| 3,520,064 | A * | 7/1970 | Kushmuk .............. | G01B 5/255 33/337 |
| 4,114,283 | A | 9/1978 | Spainhour et al. | |
| 4,115,007 | A | 9/1978 | Thiele et al. | |
| 5,033,003 | A * | 7/1991 | Lees, Sr. ................. | G01M 1/02 33/203.18 |
| 6,131,293 | A * | 10/2000 | Maioli ................... | G01B 5/255 33/203 |
| 6,662,449 | B2 * | 12/2003 | Rode ...................... | F16C 19/548 29/423 |
| 6,684,517 | B2 * | 2/2004 | Corghi .................. | G01M 1/045 33/203.12 |
| 7,337,548 | B2 * | 3/2008 | Hohlrieder ............. | G01B 5/255 33/203.18 |

(Continued)

FOREIGN PATENT DOCUMENTS

| | | |
|---|---|---|
| DE | 1922700 A | 11/1970 |
| DE | 2658117 A1 | 7/1977 |

(Continued)

*Primary Examiner* — Lisa M Caputo
*Assistant Examiner* — Tania Courson

(57) ABSTRACT

A device for measuring the geometry of a wheel axle of a motor vehicle comprising a wheel hub support for defined positioning of a wheel hub of the wheel axle. The wheel hub support comprises a wheel hub dome formed correspondingly to an outer side of the wheel hub and encompassing the wheel hub dome in a precise fit.

12 Claims, 9 Drawing Sheets

(56) References Cited

U.S. PATENT DOCUMENTS

| | | | | |
|---|---|---|---|---|
| 7,428,779 B2* | 9/2008 | Smith | ............... | G01B 5/14 |
| | | | | 29/273 |
| 7,451,548 B2* | 11/2008 | Hohlrieder | ............ | G01B 5/255 |
| | | | | 33/203.18 |
| 9,764,453 B1* | 9/2017 | Rode | ............... | B25B 27/062 |
| 2006/0266105 A1* | 11/2006 | Stieff | ............... | G01M 1/045 |
| | | | | 73/146 |
| 2011/0113637 A1* | 5/2011 | Inoue | ............ | B60B 27/0005 |
| | | | | 33/203 |

FOREIGN PATENT DOCUMENTS

| | | |
|---|---|---|
| DE | 102006029866 A1 | 1/2008 |
| DE | 112004000875 B4 | 12/2009 |
| DE | 112004000871 B4 | 6/2011 |

* cited by examiner

DEVICE FOR MEASURING THE GEOMETRY OF A WHEEL AXLE OF A MOTOR VEHICLE

CROSS-REFERENCE TO RELATED APPLICATION

This application claims priority to German Patent Application No. 10 2015 010 803.4 filed on Aug. 21, 2015, the contents of which are incorporated herein by reference.

BACKGROUND OF THE INVENTION

1. Field of the Invention

The present invention relates generally to the field of devices used in the manufacture of motor vehicles, and more particularly, to a device for measuring the geometry of a wheel axle of a motor vehicle in an assembly line.

2. Description of the Related Art

From DE 11 2004 000 871 B4 a device for measuring the geometry of a wheel axle of a motor vehicle is known where the wheel flange pickup is formed as a chuck with three radially movable clamping jaws, with the clamping jaws by radially grasping the hub and corresponding fixation of the hub hold the wheel axle onto the device. By said fixed position, the hub and thus also the wheel axle of the motor vehicle can be set in rotation in order to carry out measuring to the geometry of the wheel axle. In order to measure the geometry, up to three measuring probes are approached to the brake disk so that on the surface of the brake disk up to three measuring points are recorded from which the track, the camber and the axial run-out of the wheel axle to be measured can be determined.

In practice it may happen that the chuck grasps the hub in an inclined position so that incorrect measurements occur.

Also, increasingly wheel axles with segmented hubs are produced, which cannot be reliably grasped by the chuck, since there is the risk that an individual clamping jaw does not exactly hit a segment of the wheel hub.

Another problem is that an individual segment of the segmented hub must take up the entire holding force exercised by a clamping jaw which may lead to deformation or damage of the segment.

Consequently, the present invention is based on the objective to create a device of the type mentioned above with which also wheel hubs with segmented hub can be held which holds the wheel axle in a precisely defined position, and which can be produced in a cost-effective way.

A device configured according to said technical teaching for measuring the geometry of the wheel axle has the advantage that the wheel hub dome ac-cording to the invention receives the wheel hub in close fit so that the wheel hub on the one hand bears on the wheel hub dome and is thus carried and on the other hand cannot get out of place because the wheel hub in all directions abuts in close fit in the wheel hub dome. In this precisely defined position, in a way known by itself, the track, the camber and the axial run-out can then be determined, for example, via the brake disk.

BRIEF SUMMARY OF THE INVENTION

In a preferred embodiment a bearing surface is provided on the wheel hub dome which is formed circumferentially on the inner side of the wheel hub dome and which faces the wheel hub. As soon as the device for measuring the geometry of a wheel axle of a motor vehicle has grasped the wheel hub to be measured, the wheel hub with its outer side fits closely on the bearing surface of the wheel hub dome and is thus held in close fit. Between the wheel hub and the bearing surface still enough clearance exists in that case so that the wheel hub can be introduced into and removed from the wheel hub dome without great force.

This has the advantage that by it the wheel hub is held in close fit and thus in a defined position in the wheel hub dome so that a precise measurement, for example, on the brake disk of the wheel axle can occur.

In a particularly preferred embodiment in an area of the wheel hub dome facing the wheel hub an introduction step for grasping the wheel hub and/or for introduction of the wheel hub into the wheel hub dome is provided, which is configured in an inclined manner by an angle of 45° relative to the longitudinal axis of the wheel axle. In another embodiment the angle can be between 30° and 60°. Via said introduction phase configured similar to a conical recess, the entry area of the wheel hub dome is enlarged with the advantage that when approaching the wheel axle onto the wheel hub support, the entry area of the wheel hub dome enlarged by the introduction phase will find the wheel hub even if the wheel axle is not exactly aligned to the wheel hub support. After the wheel hub dome has found the wheel hub, the latter is grasped by the introduction phase and lead into the wheel hub dome until the outer side of the wheel hub abuts the bearing surface. This has the advantage that by this the wheel axle can be rapidly and reliably lead into the guided position within the wheel hub dome, whereby the cycle times during measurement of the geometry of the wheel axle can be kept at a low level. Moreover, such a wheel hub dome has very low manufacturing cost.

In order that the wheel hub can be held reliably in the wheel hub dome, it is advantageous, if the bearing surface comprises a minimum size varying in accordance with the embodiment. In the case of some wheel axles, there is not enough space in order to form a sufficiently large bearing surface and a sufficiently large introduction phase on the wheel hub dome. In that case the introduction phase is designed accordingly smaller and moreover a wheel hub mandrel is provided in the wheel hub support, preferably within the wheel hub dome, for grasping the wheel hub and/or for introduction of the wheel hub into the wheel hub dome.

In an advantageous further embodiment on the wheel hub mandrel on its side facing the wheel hub, a lead-in chamfer for grasping the wheel hub and/or for introduction of the wheel hub into the wheel hub dome is formed which is inclined by an angle of 45° relative to the longitudinal axis of the wheel hub. In another embodiment the angle can be between 30° and 60°. Such a virtually pointed wheel hub mandrel grasps the wheel hub of the wheel axle even if the wheel axle is not exactly on the ideal line of the wheel hub support. As soon as the foremost edge of the wheel hub mandrel contacts the wheel hub, the wheel hub via the lead-in chamfer is lead into the desired, centred position in order to introduce the wheel hub subsequently in the hub dome in such a way that an outer side of the wheel hub fits closely to a bearing surface of the wheel hub dome. In that position the wheel axle is held in a defined position and can be measured.

In another preferred embodiment a number of segment teeth are formed inside the wheel hub dome. The size, the shape and the number of segment teeth corresponds here with the wheel hub so that the segment teeth transmit the rotational movement of the device by a positive connection onto the segmented wheel hub. This has the advantage that the wheel hub rotates synchronously and without any slip with the device, for example, in order to carry out a measurement of axial run-out.

In a preferred further embodiment the segment teeth are formed in one piece to the wheel hub dome. This has the advantage that an assembly of the device can occur in a simple manner and that the manufacturing cost of the wheel hub dome are reduced.

In an another particularly preferred embodiment on the device for measuring the geometry of the wheel axle of a motor vehicle apart from the wheel hub support and in parallel to the longitudinal axis a drive pin is provided, which in its rest position is provided within the device, but which is axially displaceable from said rest position up and into an opening of the wheel axle. This has the advantage that the wheel axle is entrained via the drive pin as soon as the device for measuring the geometry is set in rotation. In this manner the wheel axle becomes slip-free and is set in rotation with the same speed as the device, for example, in order to carry out a measurement of axial run out.

In a preferred further embodiment the drive pin is preloaded with a spring. This has the advantage that the spring keeps the drive pin reliably engaged with the wheel axle in order to prevent an unintentional sliding out of the drive pin.

Further advantages of the device according to the invention result from the attached drawing and the embodiments described below. Likewise, the above mentioned features still explained more in detail can be used according to the invention individually or in any combinations with each other. The embodiments mentioned are not to be understood as a limited list but are rather exemplary.

DETAILED DESCRIPTION OF INVENTION

Figure 1:
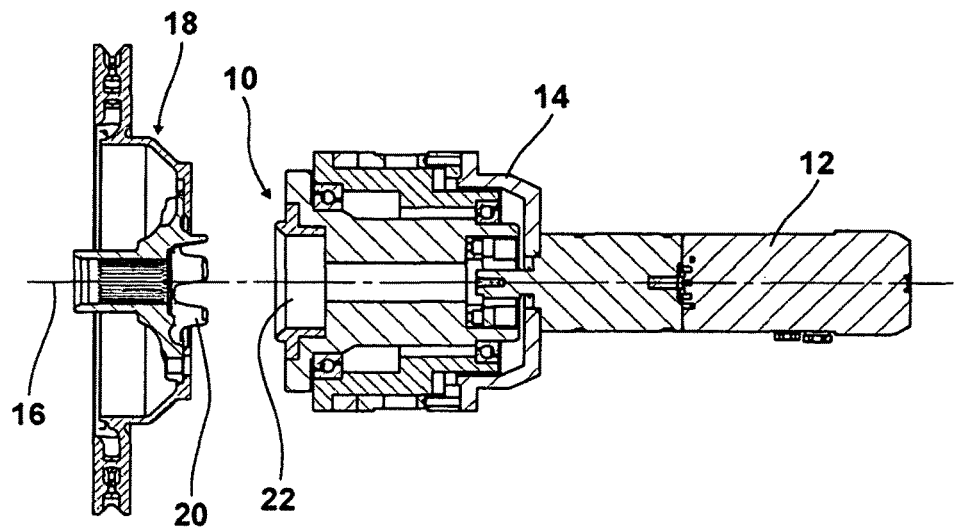
FIG. 1 a sectional side view of a first embodiment of a device according to the invention for measuring the wheel axle of a motor vehicle in exploded view with a part of a sectional view of a first embodiment of a wheel axle.
Figure 2:
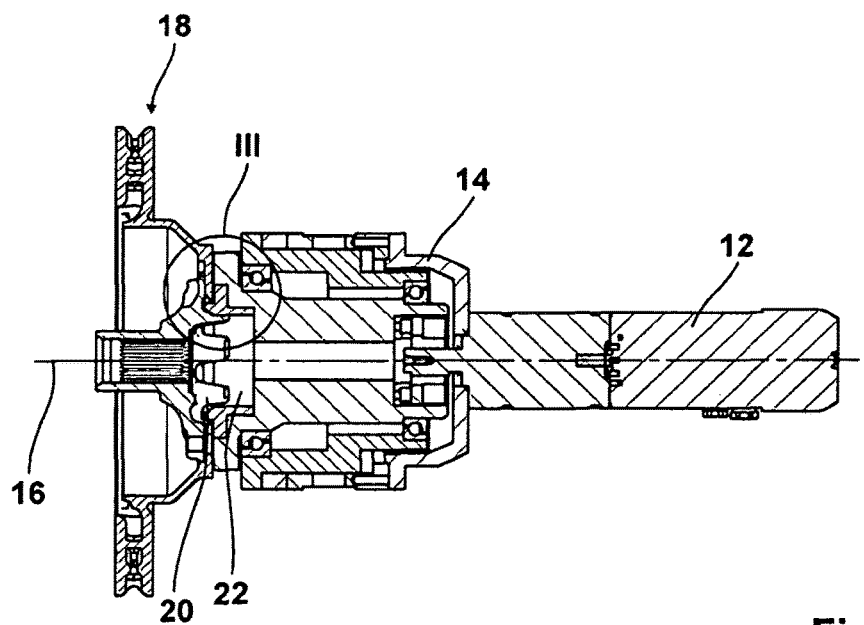
FIG. 2 the device according to FIG. 1 with the wheel axle held in the wheel hub support.
Figure 3:
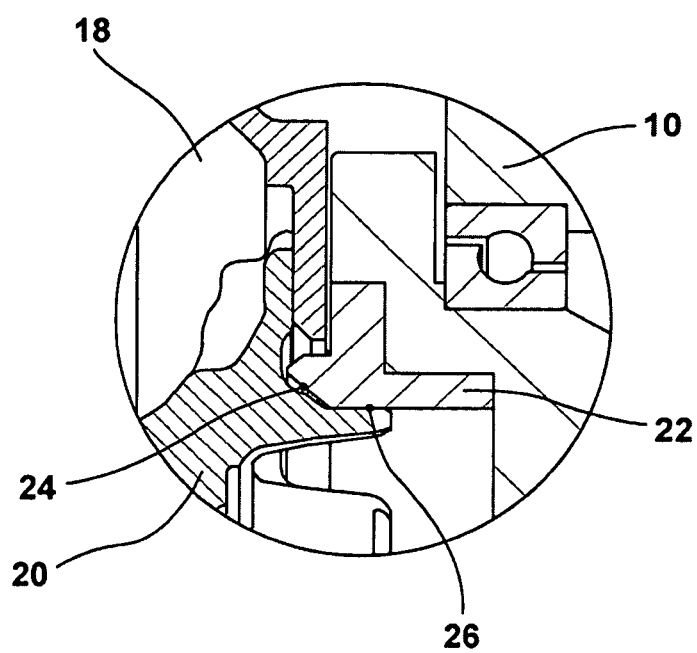
FIG. 3 a magnification of the detail of the device according to FIG. 1 and the wheel axle according to FIG. 1 along the line III.

In FIGS. 1 to 3 a first embodiment of a device according to the invention for measuring the geometry of a wheel axle of a motor vehicle is shown which shall measure a first embodiment of a wheel axle. Said device comprises a wheel hub support 10, a drive for rotating the device 12 and means for pressing 14 the wheel hub support 10 against the wheel axle 18. Said entire device for measuring the geometry of the wheel axle of the motor vehicle is arranged coaxially to a longitudinal axis 16 of the wheel axle 18 as is shown in FIGS. 1 and 3. Here, the device along the longitudinal axis 16 is moved onto the wheel axle 18 in such a way that the wheel hub support 10 grasps a wheel hub 20 of the wheel axle 18 and holds it in close fit, as this is shown in FIG. 2.

As can be seen in particular in FIG. 3, the wheel hub support 10 comprises a dome-shaped wheel hub dome 22 on the inner side of which an introduction phase 24 and a bearing surface 26 is formed. The introduction phase is inclined by 45° relative to the longitudinal axis 16 and serves for additional grasping of the wheel hub 20 in the wheel hub dome 22 even if the device is not aligned exactly coaxially to the longitudinal axis 16 of the wheel axle 18. After the wheel hub dome 22 has grasped the wheel axle 18 via the introduction phase 24, the wheel axle 18 is introduced into the wheel hub dome 22 along the introduction phase 24 until the brake disk abuts on a contact surface 26 of the device.

The bearing surface 26 is arranged on the inner side of the wheel hub dome 22 and formed in a circumferential manner in said wheel hub dome 22. The contour, the inclination and other geometrical features of the bearing surface 26 are formed correspondingly to the corresponding outer surface of the wheel hub 20 in order that the wheel hub 20 abuts in close fit in the wheel hub dome 22. Between the wheel hub 20 and the wheel hub dome 22 enough clearance remains here in order that the wheel axle 18 can be introduced into and removed from the wheel hub support 10 without great force.

In another embodiment not shown here the introduction phase can also take an angle between 30° and 60° relative to the longitudinal axis.

The first embodiment shown in FIGS. 1 to 3 comprises moreover means not shown here in detail for the creation of a pressing force 14 acting axially onto the wheel hub dome 22 by means of which the wheel hub dome 22 is pressed against the wheel axle 18 in order to lead the wheel hub 20 reliably deep into the wheel hub dome 22, and, if required, hold it in said position during the measuring operation.

The wheel hub 20 shown in said first embodiment is formed as a segmented wheel hub. As can be seen in FIGS. 1 to 3, said segmented wheel hub 20 can also be taken up by the wheel hub dome 22 without any difficulties, and be held in said wheel hub dome in a precisely defined manner. But in another embodiment the wheel hub can be formed in a closed manner, as is shown in FIG. 4.

Figure 4:
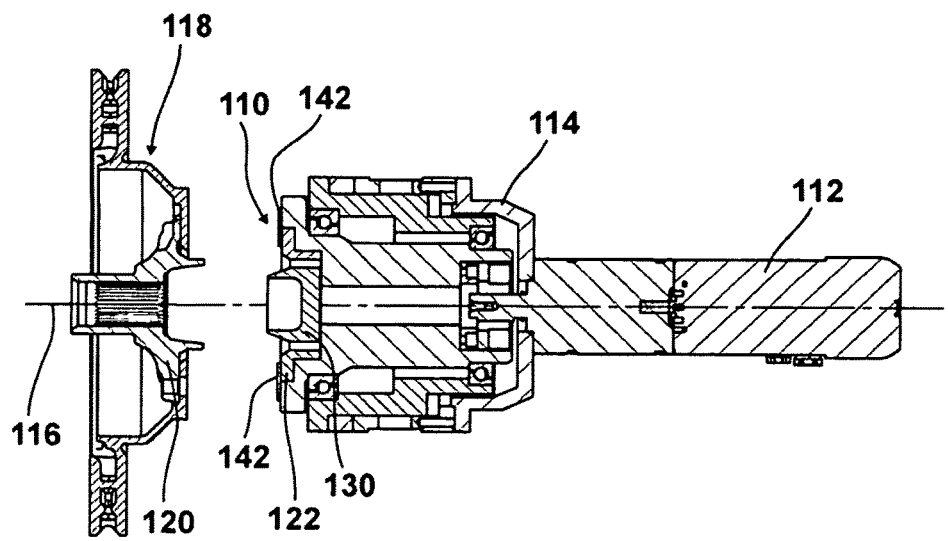
FIG. 4 a sectional side view of a second embodiment of a device according to the invention for measuring the geometry of a wheel axle of a motor vehicle in exploded view with a part of a sectional view of a second embodiment of a wheel axle.
Figure 5:
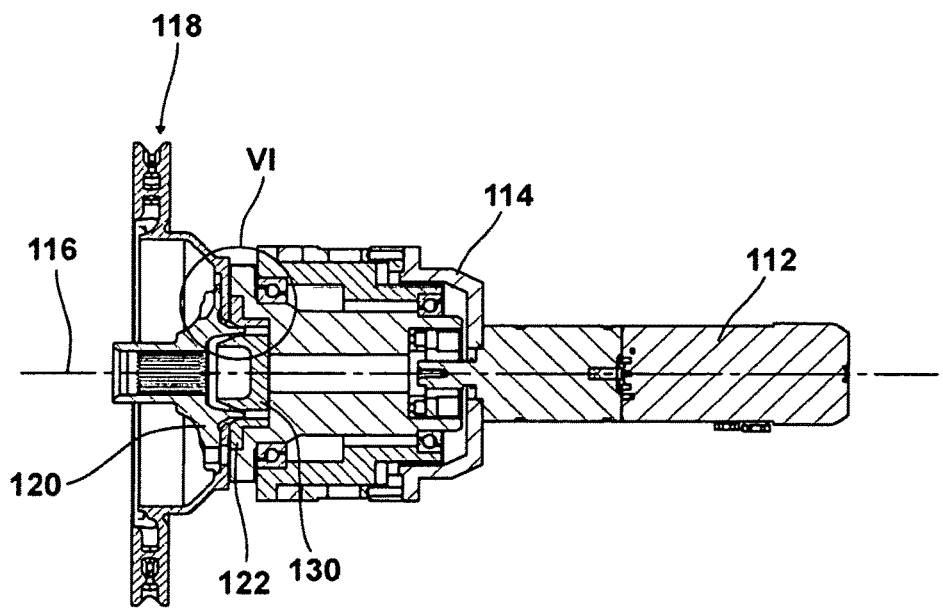
FIG. 5 the device according to FIG. 4 with the wheel axle held in the wheel hub support.
Figure 6:
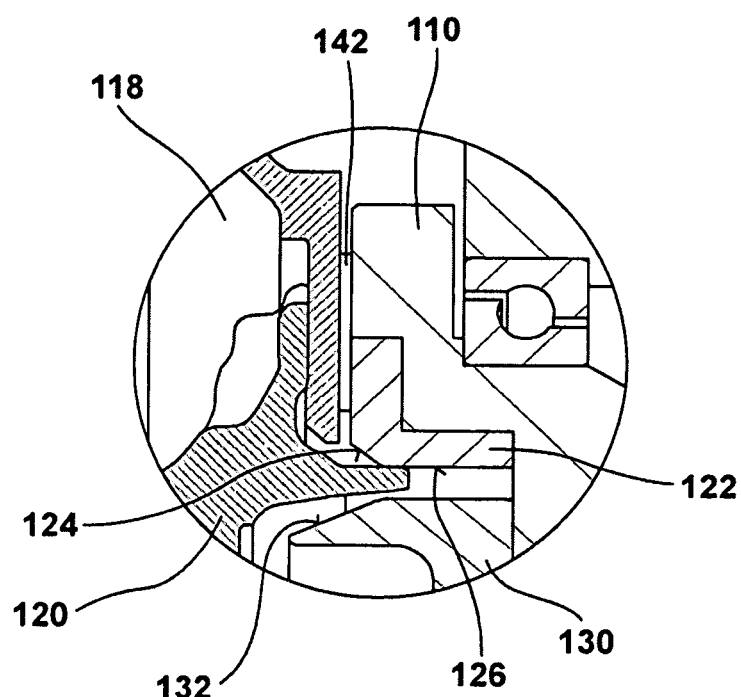
FIG. 6 a magnification of the detail of the device according to FIG. 4 and the wheel axle according to FIG. 4 along line VI.
Figure 7:
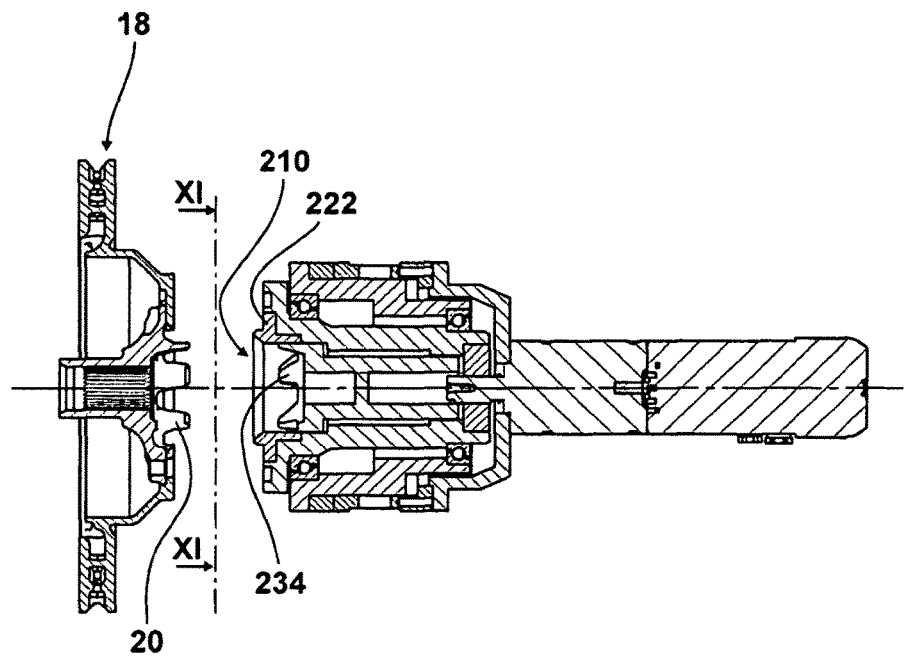
FIG. 7 a sectional side view of a third embodiment of a device according to the invention for measuring the wheel axle of a motor vehicle in exploded view with a part of a sectional view of a wheel axle according to the first embodiment of the wheel axle shown in FIG. 1.
Figure 8:
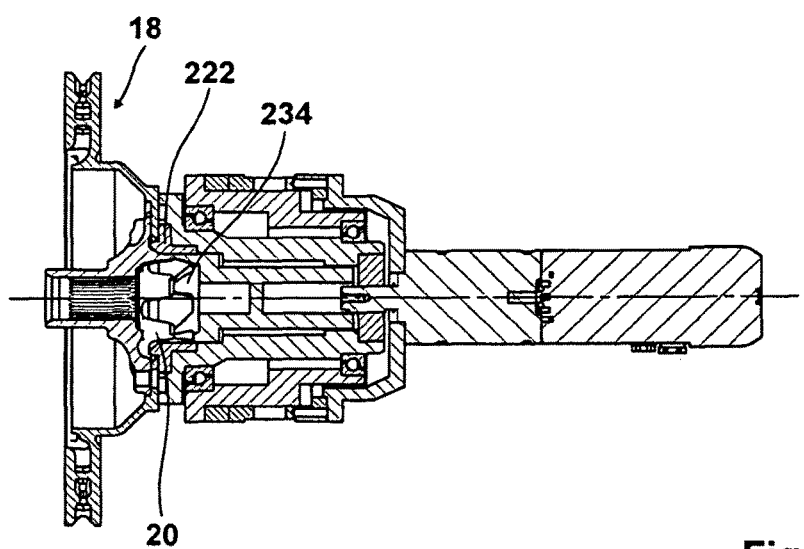
FIG. 8 the device according to FIG. 7 with the wheel axle held in the wheel hub support without engagement of the segment teeth.
Figure 9:
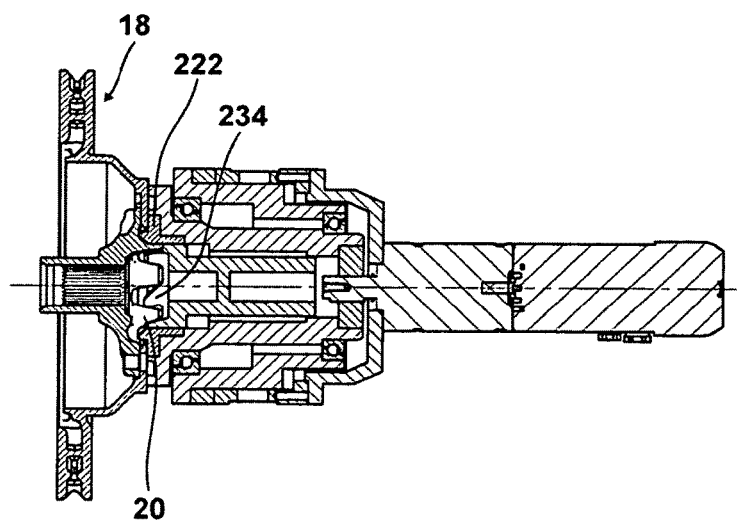
FIG. 9 the device according to FIG. 7 with the wheel axle held in the wheel hub support in engagement of the segment teeth with the wheel hub.
Figure 10:
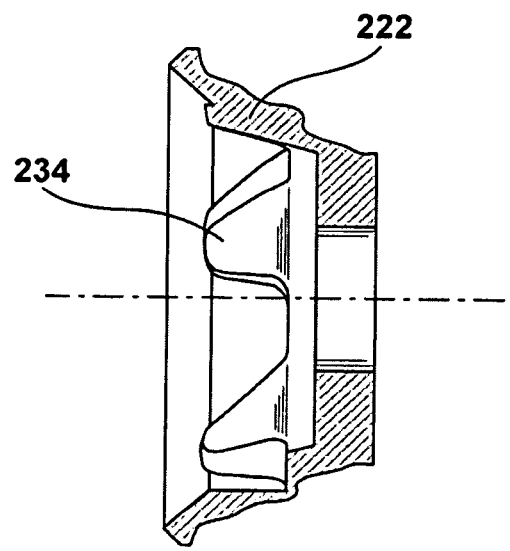
FIG. 10 a sectional side view of the wheel hub dome according to FIG. 7, sectioned along line X-X in FIG. 11.
Figure 11:
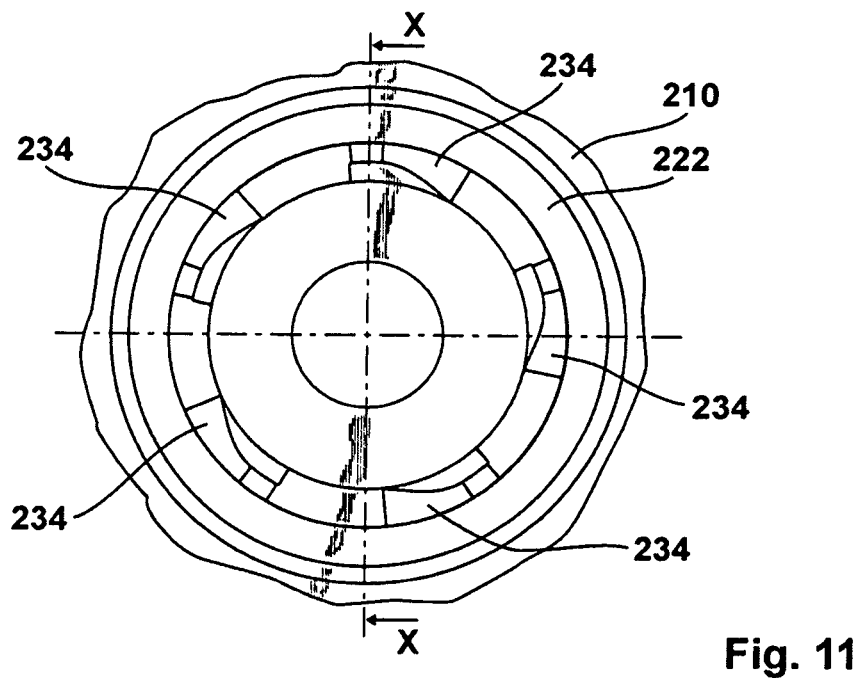
FIG. 11 a front view of the wheel hub support according to line XI-XI in FIG. 7.

In FIGS. 4 to 6 a second embodiment of a device according to the invention for measuring the geometry of a wheel axle of a motor vehicle is shown which shall measure a second embodiment of a wheel axle. The wheel axle 118 of said embodiment differs from the first wheel axle 18 shown in FIGS. 1 to 3 by the fact that the wheel hub 120 is formed in a rotationally symmetrical manner and does not have any lamellae. Moreover, immediately adjacent to the wheel hub 120 there is no free space available for taking up the introduction phase of the wheel hub dome. Otherwise, the wheel axle 118 is identical to the wheel axle 18 of the first embodiment.

In said second embodiment the wheel hub support 110 is provided with a wheel hub dome 122 which comprises a shortened introduction phase 124. In addition to the wheel hub dome 122 inside the wheel hub dome 122 a wheel hub mandrel 130 is provided. Analogous to the first embodiment here as well a circumferential bearing surface 126 is formed on the inside of the wheel hub dome 122 for bearing of the wheel hub 120 which is formed correspondingly to the outer contour of the wheel hub 120 in order to take up the wheel hub 120 in close fit. This immediately connects to the introduction phase 124 in axial direction.

In this embodiment as well the introduction phase 124 is arranged in an inclined manner by 45° relative to the longitudinal axis 116. In another embodiment not shown here the introduction phase 124 is inclined between 30° and 60° relative to the longitudinal axis.

Also, in the second embodiment shown here means for pressing 114 the wheel hub dome 122 against the wheel hub 120 are provided in order to lead the wheel hub 120 reliably deep into the wheel hub dome 122, and hold in said position during the measuring operation, if required. In said end position the wheel hub support 110 with its spacers 142 abuts the wheel axle 118.

The wheel hub mandrel 130 is arranged coaxially to the wheel hub dome 120 and possesses on its outer side a lead-in chamfer 132 via which the wheel hub 120 is lead into the desired position. The lead-in chamfer 132 of the wheel hub mandrel 130 cooperate with the shortened introduction phase 124 of the wheel hub dome 122 here in order that the wheel hub 120 is grasped reliably and lead into the desired position within the wheel hub dome 122 while the device is approached to the wheel axle 118 in the direction of the longitudinal axis 116.

In the embodiment shown here the lead-in chamfer 132 is inclined by 45° relative to the longitudinal axis 116. In other embodiments the lead-in chamfer can also be inclined between 30° and 60° relative to the longitudinal axis.

In another embodiment not shown here the wheel hub dome has no introduction phase at all. In that case the wheel hub is exclusively grasped via the wheel hub mandrel and lead into the wheel hub dome.

Also, the second embodiment comprises a drive 112 for rotating the device for measuring the geometry of the wheel axle.

In FIGS. 7 to 11 a third embodiment of a device according to the invention for measuring the geometry of a wheel axle of a motor vehicle is shown which shall measure a wheel axle 18 of first embodiment according to FIG. 1 to 3 with a segmented wheel hub 20. The wheel hub support 210 of said third embodiment corresponds to the first embodiment shown in FIGS. 1 to 3, except that inside the wheel hub dome 222 in addition a number of segment teeth 234 is provided. Said segment teeth 234 are formed correspondingly to the segmented wheel hub 20 in such a way that the segment teeth 234 engage with the wheel hub 20 in order to transmit the rotational movement of the device onto the wheel axle 18 by positive connection, if the device is in engagement with the wheel axle 18, as this is shown in particular in FIG. 9.

The segment teeth 234 immediately abut the bearing surface 226 of the wheel hub dome 222. In the embodiment shown here the segment teeth 234 are even formed in one piece with the wheel hub dome 222.

Figure 12:
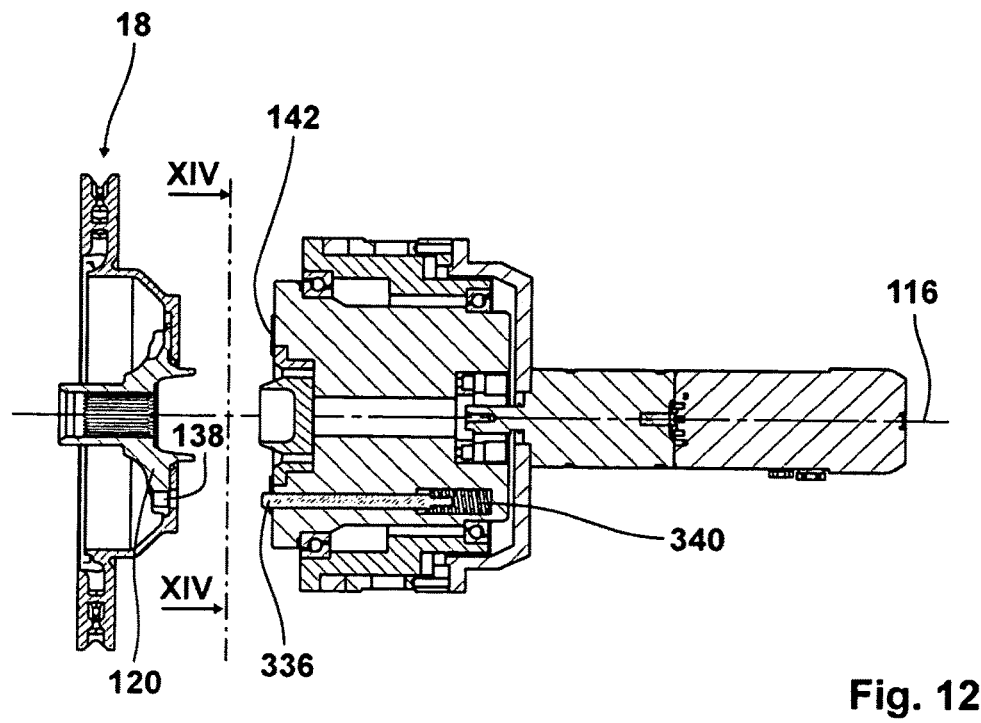
FIG. 12 a sectional side view of a fourth embodiment of a device according to the invention for measuring the wheel axle of a motor vehicle in exploded view with a part of a sectional view of a second embodiment of a wheel axle according to FIG. 4.
Figure 13:
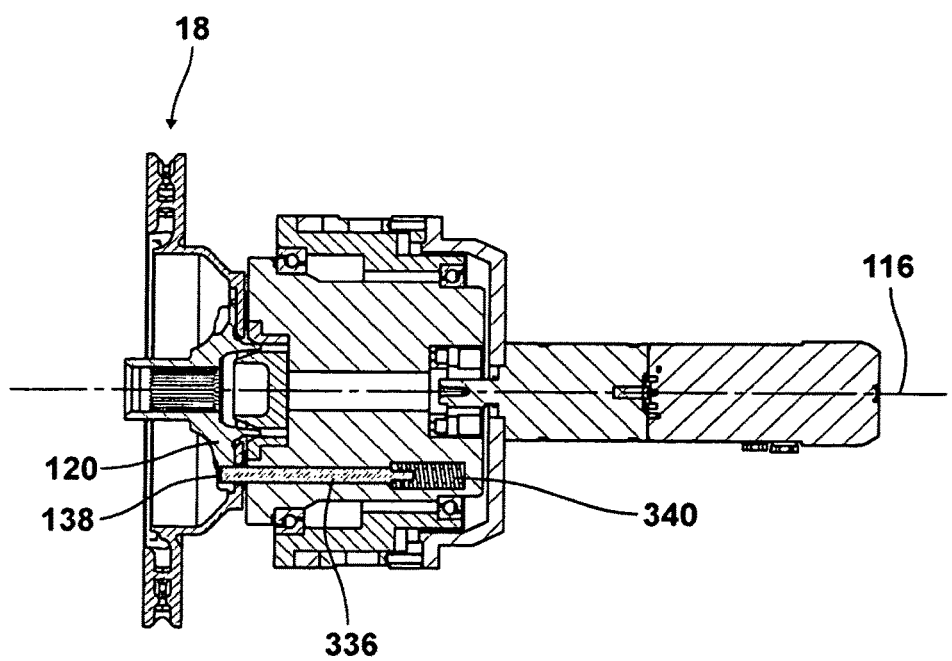
FIG. 13 the device according to FIG. 12 with the wheel axle held in the wheel hub support.
Figure 14:
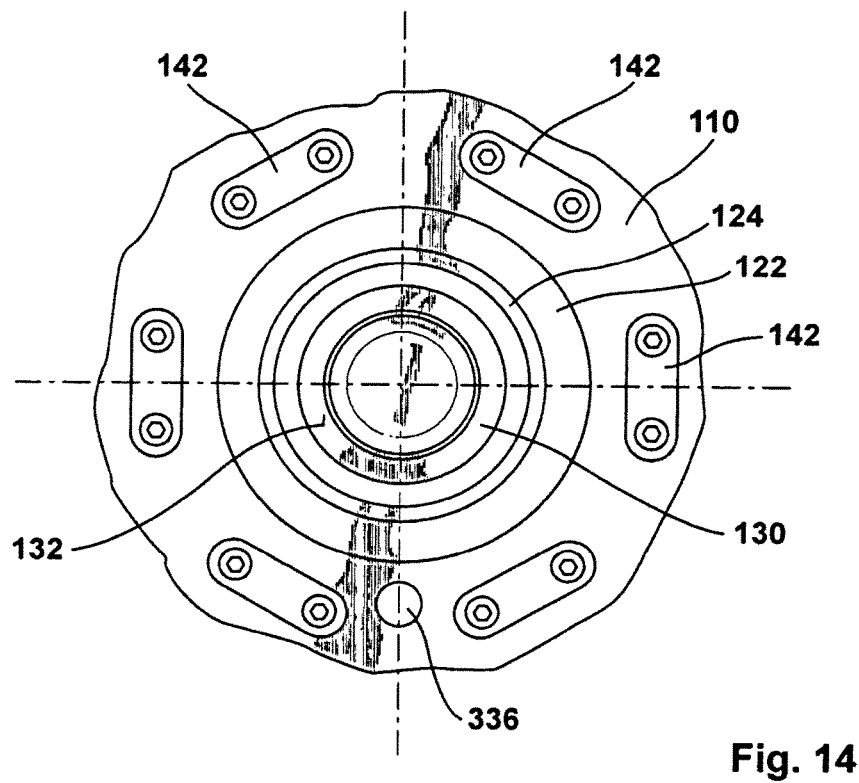
FIG. 14 a front view of the wheel hub support according to line XIV-XIV in FIG. 12.

In FIGS. 12 to 14 a fourth embodiment of a device according to the invention for measuring the geometry of a wheel axle of a motor vehicle is shown which shall measure a wheel axle 118 of a second embodiment according to FIGS. 4 to 6 with a rotationally symmetrical wheel hub 120. Said fourth embodiment is identical to the second embodiment shown in FIGS. 4 to 6 but comprises in addition also a drive pin 336 arranged in parallel to the longitudinal axis 116. Said drive pin 336 is held axially displaceable on the device in such a manner that the drive pin 336 can be introduced into an opening 138 on the wheel axle 118. With said drive pin 336 engaging into the opening 138, the rotational movement of the device for measuring the geometry of motor vehicle is transmitted by a positive connection onto the wheel axle 118 so that the wheel axle is moved synchronously to the device. This is particularly advantageous in the case of measurement of an axial run-out. The drive pin 340 is held in position by a spring 340 here.

As is shown in particular in FIG. 14, a number of spacers 142 is provided on the wheel hub support 110, distributed around the circumference. Said spacers 142 are made of a plastic, preferably a low-friction plastic. During measurement of the geometry of the wheel axle 118, the wheel hub support 110 with its spacers 142 abuts the wheel axle 118, usually on the brake disk. Because these spacers are made from plastic, scratching of the wheel axle 118, in particular of the brake disk, is prevented.

As used herein, the terms "precise fit" and "close fit" are used synonymously.

I claim:

1. A device for measuring the geometry of a wheel axle of a motor vehicle comprising: a wheel hub support comprising a wheel hub dome formed correspondingly to an outer side of a wheel hub and encompassing the wheel hub in a precise fit; and means for creating a pressing force acting axially onto the wheel hub dome to press the wheel hub dome against the wheel axle; wherein the wheel hub dome comprises an introduction phase on an inner side of the wheel hub dome; wherein the wheel hub dome forms a bearing surface adjacent to the introduction phase; wherein the introduction phase is inclined by an angle between 30 and 60 degrees relative to a longitudinal axis of the wheel axle and to the bearing surface; wherein the wheel hub dome is configured to grasp the wheel axle via the introduction phase; wherein the wheel hub dome is configured so that the wheel axle is introduced into the wheel hub dome along the introduction phase until a brake disk abuts the bearing surface.

2. The device according to claim 1, wherein the wheel hub support comprises a wheel hub mandrel configured to grasp the wheel hub.

3. The device according to claim 2, the wheel hub mandrel having a side facing the wheel hub, said side comprising a lead-in chamfer configured to grasp the wheel hub.

4. The device according to claim 3, wherein said lead-in chamfer is formed relative to a longitudinal axis of the wheel axle in an inclined manner by an angle between 30 and 60 degrees.

5. The device according to claim 1, wherein the wheel hub support comprises a wheel hub mandrel configured to introduce the wheel hub into the wheel hub dome.

6. The device according to claim 5, the wheel hub mandrel having a side facing the wheel hub, said side comprising a lead-in chamfer configured to introduce the wheel hub into the wheel hub dome.

7. The device according to claim 6, wherein the lead-in chamfer is formed relative to a longitudinal axis of the wheel axle in an inclined manner by an angle between 30 and 60 degrees.

8. The device according to claim 1, further comprising a plurality of segment teeth in the wheel hub dome.

9. The device according to claim 8, wherein the segment teeth are configured to transmit by a positive connection a rotational movement of the device onto the wheel axle.

10. The device according to claim 8, wherein the segment teeth are attached to the wheel hub dome in one piece.

11. The device according to claim 1, further comprising an axially displaceable drive pin that is set apart from the wheel hub support in parallel to a longitudinal axis of the wheel axle.

12. The device according to claim 11, wherein the drive pin comprises a spring that is configured to hold the drive pin in engagement with the wheel axle.

* * * * *